Figure 1:
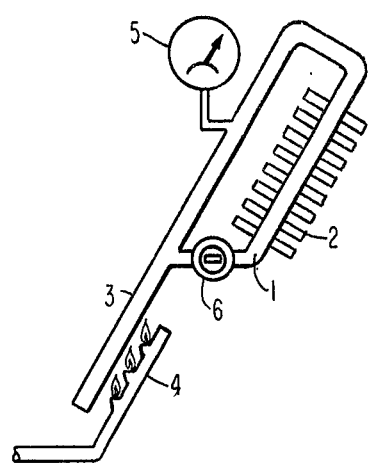

United States Patent [19]

O'Hare

[11] 4,409,961

[45] Oct. 18, 1983

[54] SOLAR WATER PUMP

[76] Inventor: Louis R. O'Hare, 1700 Banyan #3, Fort Collins, Colo. 80526

[21] Appl. No.: 246,708

[22] Filed: Mar. 23, 1981

[51] Int. Cl.³ .............................................. F24J 3/02
[52] U.S. Cl. .................................. 126/433; 60/641.8; 60/667; 165/104.21; 417/18
[58] Field of Search .................. 126/433; 165/104.21; 60/641.8, 667; 417/36, 18

[56] References Cited

U.S. PATENT DOCUMENTS

| | | | |
|---|---|---|---|
| 1,481,460 | 1/1924 | Doble | 60/667 |
| 2,153,117 | 4/1939 | Goff et al. | 417/36 |
| 2,874,716 | 2/1959 | Conchon | 417/36 |
| 2,969,637 | 1/1961 | Rowekamp | 60/641.8 |
| 2,975,347 | 3/1961 | Schaefer | 417/36 |
| 3,995,429 | 12/1976 | Peters | 60/641.8 |
| 4,119,085 | 10/1978 | Knowles | 126/433 |
| 4,280,328 | 7/1981 | Falconer | 126/433 |
| 4,341,202 | 7/1982 | French | 126/433 |

Primary Examiner—Ronald C. Capossela

[57] ABSTRACT

The intermittent generation of steam by a solar heat source provides a reciprocating column of water when the steam pressure acts on the top of a water column and the column in turn causes a diaphram in a chamber first to expand into an adjacent chamber when the water in the column is placed under pressure and then secondly to contract when the pressure is relieved and thereby the expanding and contracting cavity experiences a pressure which expels water from the cavity through a check valve as the cavity contracts and subsequently as the pressure is relieved the vacuum formed in the cavity as it expands draws in water through another check valve for later expulsion. The reciprocating action of the water in the column that moves the diaphram into and out of the pumping chamber is caused by alternating surges of steam in which the pressure is increased when water from a reservoir in constant fluid flow communication with a steam generating chamber is periodically caused to flow to the steam generating chamber and then impeded from flowing to the chamber. In a principal embodiment the water reservoir is elevated over the steam generating chamber and the means of providing intermittent water flow to the steam generating chamber is gravity flow controlled by a valve.

11 Claims, 9 Drawing Figures

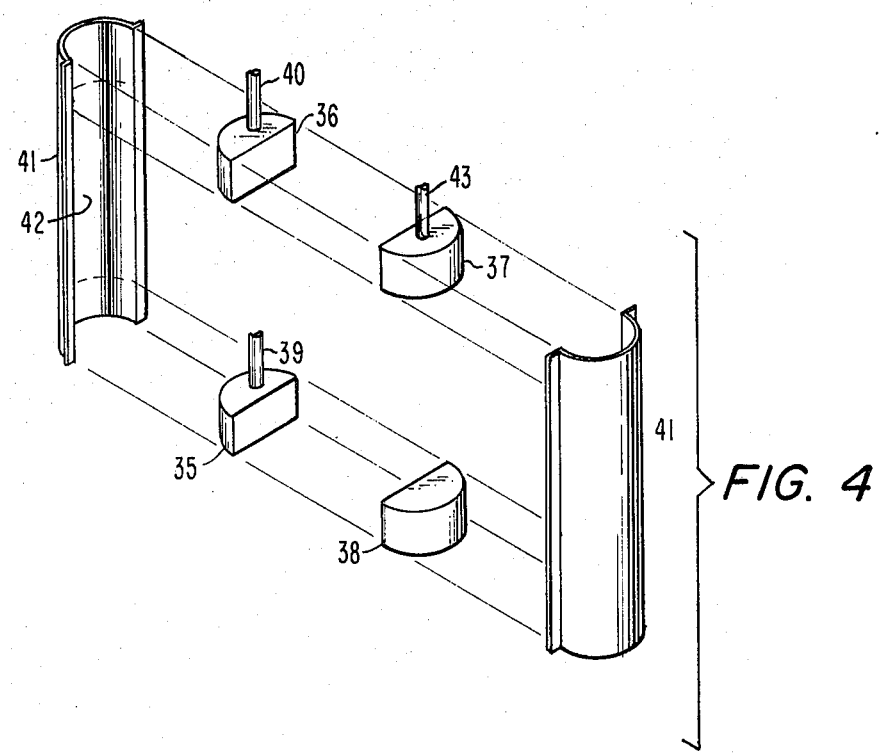
FIG. 4
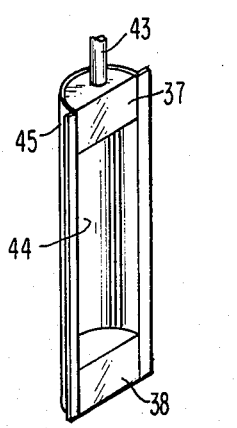
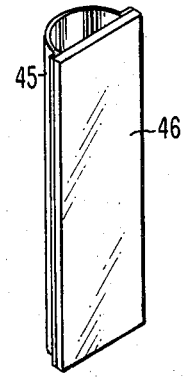
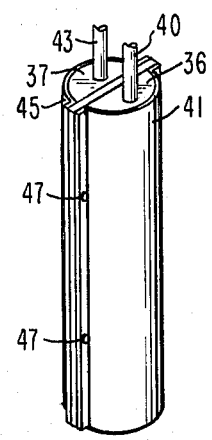
FIG. 5a   FIG. 5b   FIG. 5c

SOLAR WATER PUMP

This invention follows upon the displacement pump of a parent application which is my previous invention called, "Pulsing Steam Solar Water Pump" of filing date, Dec. 7, 1979 and U.S. Pat. No. 4,309,148.

This invention is a solar powered water pump that used solar heated steam to pump water from a deep well. The energy of the steam is transmitted down the well to the pump by means of a water filled hose or duct. The water in the hose is intermittently pressurized. During pressurization the water in hose or duct is directed against a diaphram in a chamber at the bottom of the well. The water pressure in that chamber forces the diaphram into an adjacent chamber. This action forces water in the adjacent chamber out of that chamber through a check valve and upwards toward the surface. The column of water that transmits the energy of the steam to the pumping diaphram is subsequently relieved of pressure from the steam and the elastic diaphram retracts itself from the adjacent pumping chamber into which it had been forced by the pressurized water column. The contracting action of the diaphram with the pressure removed causes the cavity of that adjacent pumping chamber to expand and to create a vacuum which draws in water from the well bed into that same pumping chamber through a check valve thereby filling the pumping chamber and making it ready for the subsequent pressurization when water will force the diaphram into this chamber again and again drive the water through the first check valve and toward the surface. The novelty of this invention derives from the way in which solar energy is employed to provide the reciprocating column of water which does the work of pumping by moving the diaphram back and forth. In the former art steam pressure has been used to pump water when the steam pressure formed in a boiler was directed into a water filled chamber by valving and the pressure of the steam then forced the water from the chamber through a check valve. When the valving that admitted the steam was closed, the condensing steam then created a vacuum which was able to draw into the chamber other water through another check valve in order to fill the chamber for another pressurization cycle when steam would again drive the water from the chamber. However, in this present invention water is not drawn into the chamber through one check valve to subsequently be expelled through another, but rather the water that is driven out of the chamber through a duct in place of the check valve is subsequently returned to the chamber so that the same water merely moves back and forth, in and out, of the chamber. In this invention the chamber in which steam acts on the water is only indirectly a pumping chamber in that the same water which is pushed from the chamber immediately returns to it, and the water moves back and forth to provide a reciprocating column of water and it is then the column of water which is employed to do pumping work at great distance from the source of the steam. In this way the principle of steam pumping may be employed at the bottom of a well where it would be difficult to employ a steam pumping chamber since much of the steam would condense on its way to the steam chamber at the bottom of the well. The vacuum produced in a steam pumping chamber left on the surface would only be capable of drawing up water from a depth of thirty nine feet but by the concept of this present and novel invention, the high pressure steam acting on the column of water wold provide hydraulic pressure for pumping at a great depth. Beside providing a means of extending the use of the steam pump for pumping from deep wells, the object of this inventive concept is to produce steam surges in a different way and to extend the utility of my copending application Ser. No. 101,218 called, "Pulsing Steam Solar Water Pump". This copending application does not require a separate boiler to provide pressure surges of steam from a solar collector, but it is not able to draw water to the pump for pressurization from a depth of over thirty nine feet. Its novel method of providing pressure surges quickly whenever sunlight is available provides an ideal source of solar heated steam energy for actuating the deep well pumping system of this present invention. Another object of this present invention is to provide a more simple and less costly means of producing steam surges from a solar collector in order to pump water with solar heated steam in a more simple manner. This is done in one embodiment by providing an alternate means of intermittent water delivery to the steam generating chamber. This new provision removes both the requirement of the small electric water pump and also removes the requirement for that part of the solar cell array needed to energize that pump. This object is accomplished by elevating the pumping chamber in which the steam acts on the water to a position higher in elevation than the water inlet to the steam generating chamber. Still another object is to combine the advantages of the simpler steam pulse generating system with the advantages of the reciprocating water column in order to provide a simple, solar pump that can pump water from deep in the earth.

The mechanisms for achieving these objects in the various embodiments will be clarified by referring to the drawings.

FIG. 1 of the drawings is a diagram which illustrates how water admitted from a cooler to a strongly heated pipe is converted to steam that pressurizes both the pipe and the cooler.

Figure 2:
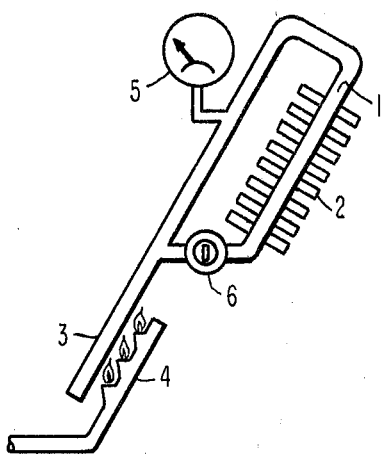

FIG. 2 of the drawings shows that when a cooler condenses steam and the condensed water is impeded from the heated steam generating pipe then there is less water present to be vaporized and the pressure drops.

Figure 3:
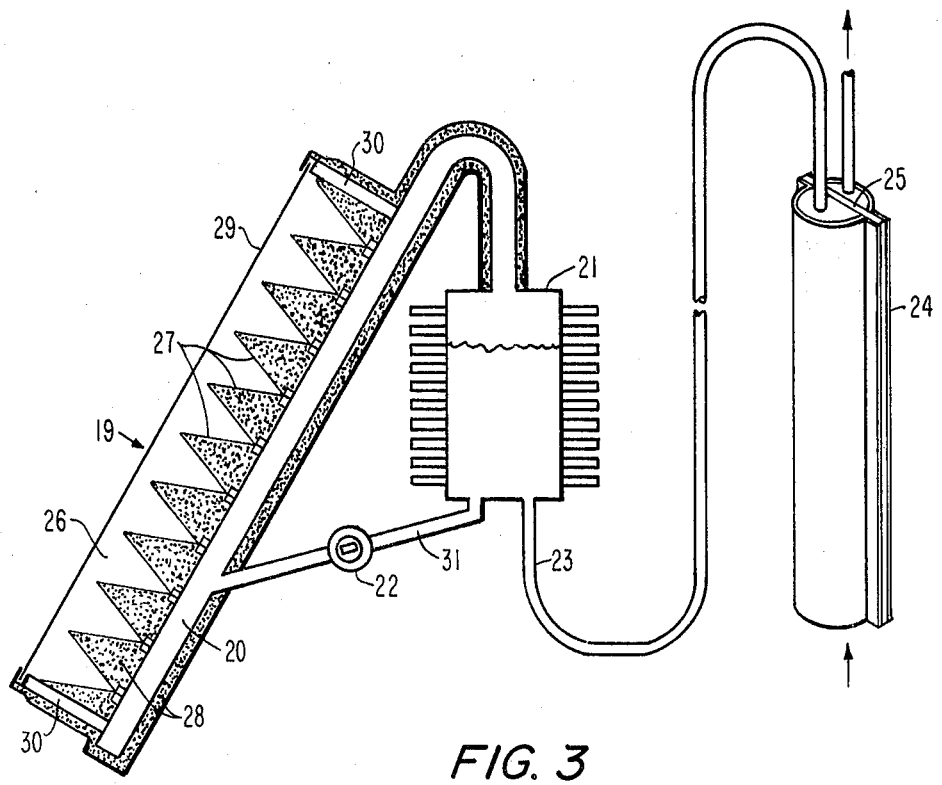

FIG. 3 of the drawings shows a water cooler with cooling fins and a high temperature solar collector for converting some of the water to steam and providing a pressure surge on a water column that drives a pump.

FIG. 4 of the drawings shows components of the pump mechanism which is inserted into the well.

FIGS. 5A–C show components and the assembled pump that is inserted into the well.

Figure 6:
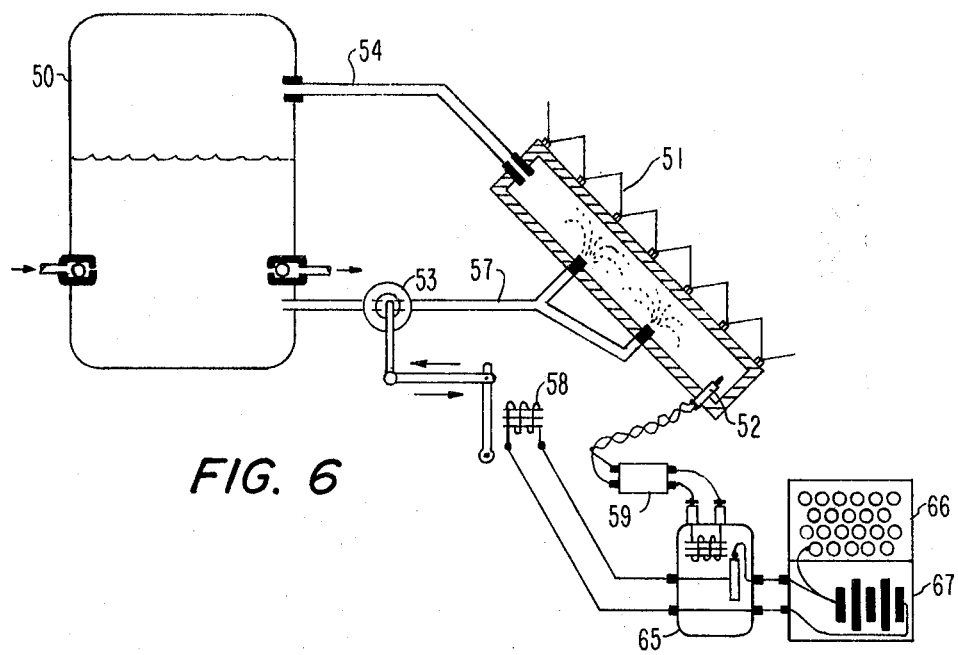

FIG. 6 of the drawings is a diagram of a simplified solar heated water pump using a gravity water delivery to produce steam pulsed for pumping.

Figure 7:
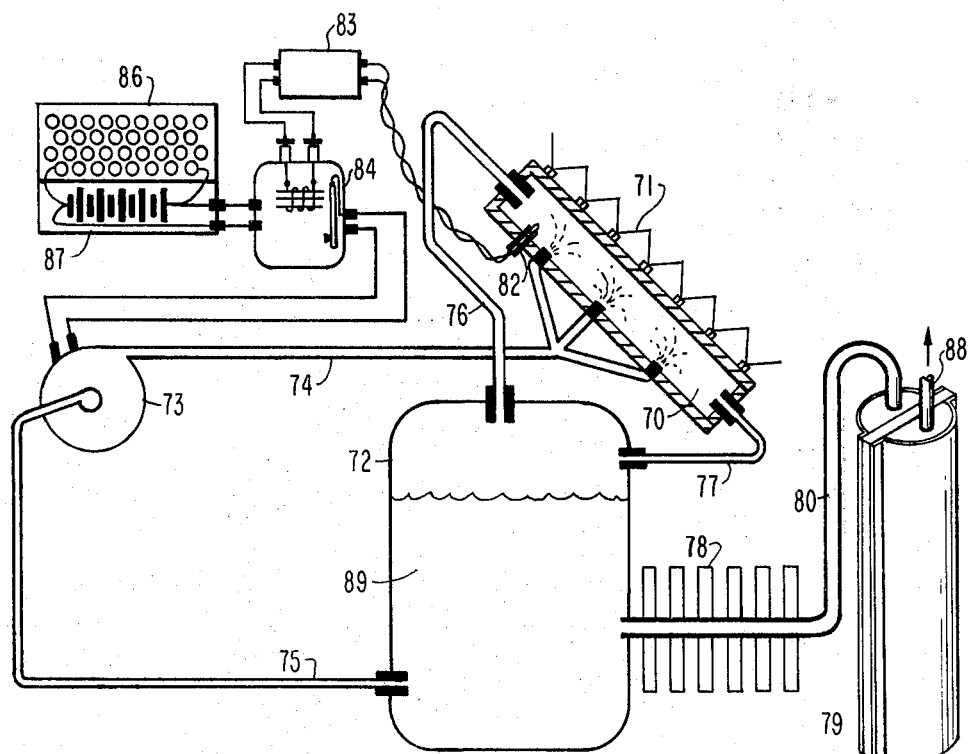

FIG. 7 of the drawings shows an automatic solar heated pump adapted for pumping from greater depths by the use of a diaphram pump.

Referring then to FIG. 1 of the drawings, water 1 in cooler 2 is being admitted to pipe 3 in which it is heated by burner 4 and converted to steam which causes a pressure throughout the entire cavity composed of 2 and 3 and indicated on meter 5. Since the entire cavity is at the same pressure, the water that condenses in 2 is able to flow by gravity through valve 6 when it is open thereby maintaining the pressure in the cavity. Referring now to FIG. 2 which has all of the elements of FIG. 1 but in which the situation is different, the valve 6 is closed preventing water flow to heater 3. Condenser-cooler 2 has condensed the steam generated in 3 and reduced the pressure in the entire cavity as indicated by gage 5. The size of 2 together with its cooling effect is large enough in relation to the heating of burner 4 to enable 2 to condense a large proportion of the steam in the cavity of 2 and 3 when 6 is closed. When more water is condensing in 2 than is being admitted to 3 then less steam is being generated in a given period of time and the pressure drops. This is the case when valve 6 is closed. the intermittent opening and closing of 6 produces pressure variations within the cavity. In the invention these pressure variations are made to do pumping work according to the following desriptions.

Referring then to FIG. 3 of the drawings, the consentrating collector 19 heats the collector's steam generating chamber 20 which receives periodic flows of water from cooled water tank 21 by the periodic opening and closing of valve 22. The intermittent surges of steam that are generated in 20 intermittently displace a quantity of the water in duct 23 forcing the water down and against the diaphram in pump 24. (The manner in which this action is used in 24 will be explained in detail in subsequent FIGs.) Part of the diaphram of 24 is shown by 25. At the end of each surge of steam the vacuum that follows by the condensation in 21 as well as the recoil of the elastic diaphram moves the displaced water back to its original position and level in tank 21. The end of each surge of steam is effected by the closing of valve 22 which permits condensation in 21 to take place more rapidly than steam generation in 20. The low pressure then formed over the water in 21 draws in more steam from 20, condensing it also and reducing the heat flow from 20 by reducing the water vapor that would conduct the heat from 20. This allows the temperature of 20 to increase for use in a subsequent period when valve 22 will again be opened and gravity will again deliver water to 20 for the production of more steam. The consentrating collector 19 has a plenum chamber 26 heated by converging reflective plates 27 which open at a very narrow angle to repeatedly reflect light inward and toward the plenum to produce a high temperature there. The insulation 28 shields both 26 and 27 against heat loss as does the glaze 29 which is supported by support 30. The duct 31 transfers some of the water from tank 21 to 19 for conversion to steam, but water does not leave the cavity formed by 19, 21, 31, 23 and 24. This is because whatever water is converted to steam in 19 is again condensed in 21 and the water forced down duct 23 reciprocates back again when the pressure is removed.

Referring now to FIG. 4, the four end pieces 35, 36, 37, and 38 each have the shape of one of the sections that is formed when a short length of rod is divided approximately in half along the length of the rod. Three of these pieces 35, 36, and 37 have holes through their length. The holes in 35 and 36 are fitted with check valves 39 and 40. By means of welding or water-tight bonding 35 and 36 are positioned with their concave sides extending into trough 41 at either end of this trough. With 36 at the upper end of 41 its check valve 40 is in a manner that will permit fluid flow upwards and out of the trough only. Similarily with 35 positioned at the bottom of trough 41 the check valve 39 of end piece 35 is attached to permit fluid flow only into the trough. This trough 41 has the shape formed when a long cylinder is divided in half along its length. Short flanges extending radially outward are part of this trough 41. These flanges extend the entire length along the length of 41 and are employed for joining troughs together in such a way that their concave surfaces face each other. This connection of troughs will be described in more detail in the following FIG. 5. In this FIG. 4 the pumping chamber 42 is formed in part by the composition of 41 with end pieces 35 and 36 together with their check valves 39 and 40. The end piece 37 has the same form as 35 and 36 except that the hole through its length is fitted with a connector 43 in place of a check valve. The end piece 38 is the same in form as 35 and 36 except that it does not have any hole nor is it fitted with a connector nor a check valve. The chamber 42 becomes a closed chamber when it is covered with a diaphram whose placement and function are described in the following FIG. 5.

In FIG. 5a then, the chamber 44 is formed by trough 45 in the shape of a half cylinder like trough 41 of FIG. 4. FIG. 5a shows 44 with its end pieces 37 and 38. FIG. 5b shows the same trough without its end pieces so that 46 the diaphram which is a wall of chamber 44 may be clearly shown in its position relative to trough 45. This diaphram 46 is a strong, elastic, rectangular partition which is at the same time a common wall between chamber 44 and chamber 42 of FIG. 4 when these two chambers are placed together with their concave surfaces facing each other. The FIG. 5c shows this placement in which trough 42 and trough 44 with all of their end pieces and check valves and connectors are placed together to form two separate chambers separated by the diaphram 46 which may be stretched and distorted under pressure but returns by virtue of its elasticity to its original shape when the pressure is removed. This is what happends when water pressure produced in chamber 44 forces 46 into chamber 42. Thereby 42 becomes smaller in volume and water is forced out through 40. Then when the pressure in 44 decreases 46 regains its original shape, thereby expanding the volume of 42 and drawing in water through check valve 39. The bolts 47 hold the troughs tightly together sealing them by compressing them against the diaphram 46 which separates them.

Referring next to FIG. 6, the elevated water tank 50 receives solar heated steam from consentrating collector 51 when probe 52 reaches a high steam generating temperature and when valve 53 is opened to admit water from 50 to 51 where it is converted to steam in the insulated phenum of 51. The water is able to flow by gravity from 50 to 51 because the weight of the column of water above the point of the water's entry into the steam generating chamber is always added to the pressure of the steam. This is because there is always approximately equal pressure of steam over the water as there is pressure of steam in the generating chamber of the collector because of insulated transfer duct 54. Since the pressures are equal over the water and in the generator then the weight of the water column can effect the downward movement of the water into the generator. While the top and the botom of the water column face of the same steam pressure, nevertheless, the bottom of the water column also has a downward pressure that is additional to the steam pressure namely the weight of the water column itself. This moves the water into the steam generating area but, while gravity is moving the water to be converted to steam inside the high pressure steam environment, nevertheless at the same time the steam pressure itself is acting to force the water in the tank 50 out of check valve 55 to a low pressure area outside of the tank. When the tank reaches a lower level and sufficient water has been pumped from it and the collector has lost temperature in the production of steam valve 53 closes and the steam over the water condenses then the vacuum created inside 50 draws in water through check valve 56. When the collector has had time to reheat, the cycle begins over again. The principal event governing the operation of the pump is the control of valve 53 by the use of probe 52. In the principal embodiment of this concept 52 is a heat-variable resistor whose value of resistance increases as the temperature increases. The resistor is connected to the inverting input of a linear amplifier with the effect that as the resistance increases the amplifier's output current also increases. At a calibrated point, as the temperature reaches a level high enough to produce steam with enough pressure to achieve the required pumping level, the resistance of the probe will then be sufficiently low to have caused the amplifiers output to have risen to the level at which it is able to activate relay 65 which then brings current from photoelectric cell array 66 and battery 67 to electric valve mechanism 58 to open valve 53. The armature of is easier to hold on than it is to first engage and it requires considerably less current to maintain the contacts in a closed circuit position than it does to initiate the closing of the contacts. For this reason the resistance of 52 may drop significantly while the temperature of the steam generator drops significantly before the output of amplifier 59 has dropped sufficiently to open the contacts of 55 and close valve 53. The temperature difference between the point at which the collector begins generating steam and and the point at which it ceases in any cycle may be determined by the difference in the current required to engage and the current required to hold the relay contacts engaged and this may be determined by the tension on the relays armature as well as by the spacing between the armature and its magnet. Calibration of the actuation temperatures is also accomplished by adjustment of the amplification factor of the amplifier 59 as well as by adjustment of the gain of this amplifier according to state of the art practice. The duct 57 brings the water from the tank 50 down to the steam generating chamber of 51.

Referring then to FIG. 7 of the drawings, a diagramatic drawing depicting the solar steam pump adapted for pumping from a deep well is shown. A steam generating chamber 70 which is a plenum of a consentrating solar collector 71 receives heat by conduction from narrowly converging reflective plates which repeatedly reflect incident light toward their apex where the reflections are trapped and unable back away from the apex. This plenum 70 is part of a cavity composed of a water pumping chamber or tank 72 and the pumping chamber of a small electric pump 73 with its ducting 74 and 75. Also part of this cavity are ducts between 70 and 72 which are ducts 76 and 77. The final parts of this cavity are finned cooler 78 and diaphram pump 79 with ducting 80 between coole 78 and diaphram pump 79. The probe 82 corresponds to the probe 52 of FIG. 6. The amplifier 83 of this FIG. 7 corresponds to amplifier 59 of FIG. 6. The relay 84 likewise in this FIG. 7 is the same as relay 65 of FIG. 6. Similarly the photovoltaic cell array 86 with its chargeable battery pack 87 in this FIG. 7 are the same as the photovoltaic array 66 and battery 67 of FIG. 6. When probe 82 of this FIG. 7 reaches a temperature at which high pressure steam is generated amplifier 83 activates relay 84 which switches current from 86 and 87 to small electric pump 73 the pumping chamber of which is always at approximately the ambient pressure of the cavity composed of 70, 72, 76, 77 and 78. Because the pressures are nearly equal throughout the cavity, 73 has merely to expend enough energy to lift some water from 72 to 70 for the purpose of generating steam. Pump 73 does not have to pump water against the pressure of the cavity because its work is done within the cavity. This is in just the same way that a small water pump in a highly pressurized submarine has to work just as hard to lift water three feet when the air pressure inside is 150 psi. as it does when the inside pressure is 15 psi. This is true as long as the pump does not have to pump water into or out of the submarine and all the work is done within the confines of the submarine. Accordingly, when 73 pumps water to 70 and the pressure rises in 72 some water is forced through 78 and 80 and against the diaphram in diaphram pump 79. This diaphram pump 79 is the same as the submersible diaphram pump described in FIGS. 4 and 5. The pressure on the water in 80 and against the diaphram of 79 causes the diaphram of 79 to expell water through duct 88 which is connected to the exit check valve of 79. This is the same exit check valve as the valve 40 of FIG. 5c. As the water from 73 through duct 74 cools 70 and 82 then 83 and 84 act to stop 73 and as steam ceases to be generated in 70, the remaining water 89 condenses the steam in 72 thereby creating a vacuum in 72. The vacuum then relieves the water pressure on 80 and on the diaphram of pump 79. The diaphram then contracts from its extended position in the pumping chamber of 79 and as it does so draws water into the pumping chamber of 79 which is the same as the pumping chamber 42 of FIG. 4. In this FIG. 7 the finned cooler 78 assures that the steam heated water reciprocating in and out of 72 will not become too heated to continue to condense steam during the vacuum part of the cycle.

In the diagrams of the various figures a type of consentrating collector is shown to represent particular embodiments. In other embodiments other consentrating collectors may be used and the presentation of one type is not meant to limit the inventive concept to one type of consentrating collector nor only to consentrating collectors, but any consentrating collector known in the solar art may be used by heat sinks connecting it to the steam generating chamber. Other collectors that are capable of reaching steam generating temperatures may be utilized in the same manner.

It should also be noted that throughout the description of the inventive concept of working elements of various embodiments are intended to be interchangeable with elements of similar function in other embodiments. Forinstance, the manual valve 22 of FIG. 3 can be interchanged with valve 53 and its control mechanism of FIG. 6. Similarly, the use of a gravity delivery system for the intermittent injection of water into the steam generating chamber is not meant to preclude the use of a small motor driven pump to assist in the injection of water nor the use of the small motor driven pump in the place of a valve like valve 53 of FIG. 6. Also there are some obvious extensions of the basic inventive concept. One of these extensions that forms another embodiment is the use of each type of pumping mechanism of this invention to provide a motive force for a boat not shown. In this case the water that is expelled from the pumping chamber, like the chamber 21 of FIG. 3 or 50 of FIG. 6 or chamber 72 of FIG. 7, is directed rearward and into the water. In this way this solar water pump is used as a reaction engine when placed on a boat. The pump's output produces a jet drive and inlet water may be taken from the water through which the boat is moving. In another embodiment combustion heat sources are used to heat the steam generating chamber in the way that burners heat a boiler. Similarly, geothermal heat may be applied to the steam generating chamber.

I claim:

1. A steam driven water pump comprising:
an alternating steam pressurization and vacuum production means in the form of two chambers and multiple ducting placing the chambers in fluid flow communication, one chamber being a displacement chamber capable of containing water and sustaining steam pressure and the other chamber being a heating chamber capable of transmitting heat energy to water periodically delivered to it and of sustaining steam pressure from the steam converted from the heated water, and said chambers being in fluid flow communication with each other by means of multiple ducting and valving, one duct being capable of providing steam pressure fluid flow communication between the top portions of each chamber and another duct being capable of providing periodic water flow communication through a valve from said water displacement chamber to said heating chamber to thereby provide periodic water contact with the heating chamber and consequent water conversion to steam pressurization of the chambers and, steam generator chamber heating means in the form of a thermal energy source in heat flow communication with the heating chamber and, water receiving and water impelling means by which the water in the displacement chamber can be driven from that chamber during periods of steam pressurization, and by which water can be recieved into that chamber during alternate periods of vacuum production in which periods water flow to the heating chamber is prevented, said water receiving and water impelling means being in the form of additional ducting placing the displacement chamber in fluidflow communication with a water source and reservoir and,
internal water circulation means by which water is moved from the water displacement chamber to the heating chamber and,
internal water circulation control means in the form of a valve capable of repeatedly, alternately providing and then preventing water fluid flow communication from the displacement chamber to the heating chamber.

2. A steam driven water pump as in claim 1 in which the internal water circulation means is a gravity feed water circulation means in the form of ducting segments with the valve of the water circulation control means positioned between the segments, said segments extending downward from an elevated displacement chamber to a pressurization chamber inlet below the elevation of the displacement chamber and said ducting being capable of placing in serial fluid flow communication the displacement chamber, the valve, and the heating chamber.

3. A steam driven water pump as in claim 1 in which the internal water circulation means is a gravity feed water circulation means in the form of ducting and a valve from an elevated displacement chamber containing water, and in which the water receiving and water impelling means is additionally multiple ducting and check valves in fluid flow communication with the displacement chamber, with one duct providing fluid flow from a check valve and a water source to the displacement chamber and another duct providing fluid flow communication from the displacement chamber to a check valve and a water outlet.

4. A steam driven water pump as in claim 1 in which the water receiving and water impelling means is in the form of water ducting providing fluid flow communication between the displacement chamber and the water source and reservoir, having additionally an hydrolically operated diaphram pumping means in the form of a long cylinder divided along its length into two chambers by a strong elastic diaphragm, the one chamber being the driving chamber sealed except for water ducting connections providing fluid flow communication to the displacement chamber, the other chamber being a pumping chamber with inlet and exit check valves and being capable of pumping water by the expanding and contracting of the diaphram into and cut out of the chamber under the influence of the intermittent pressurizations of the displacement chamber transmitted to the driving chamber.

5. A water pump as in claim 1 in which the internal water circulation means is a small pump, the pumping chamber of which is part of a cavity which includes the water displacement chamber by means of ducting providing fluid flow communication to and from the pumping chamber of the small pump and connecting the inlet of the small pump to the water in the displacement chamber below the water level within the chamber and connecting the outlet to the heating chamber and additionally,
a diaphram pumping means in the form of a diaphram pump the driving chamber of which is in fluid flow communication with the displacement chamber by means of ducting through which the same water that is dispelled from the displacement chamber is made to return to it thereby providing a reciprocating column of water that is in fluid flow communication with the diaphram of the diaphram pumping means, said diaphram pumping means being in the form of a long cylinder divided along its length into two chambers by a strong elastic diaphram, the one chamber being sealed except for water ducting connections providing fluid flow communication with the water displacement chamber, the other chamber being a pumping chamber with inlet and exit valves and being capable of pumping water by the expanding and contracting of the diaphram into and out of the chamber under the influence of the intermittent pressurizations of the displacement chamber transmitted to the driving chamber.

6. A steam driven water pump as in claim 1 in which the steam generator chamber heating means is a solar energy consentrating collector in heat flow communication with the heating chamber capable of converting water to steam.

7. A water pump as in claim 1 in which the internal water circulation control means is a valve, the opening of which establishes water fluid flow communication between water in the bottom of an elevated displacement chamber and the steam generator heating chamber, with the fluid flow communication of the water being caused by the action of gravity and the elevated position of the water above the entrance point of the water into the heating chamber as well as to pressure equalization ducting providing steam fluid flow communication between the heating chamber and the displacement chamber, and the closing of which valve prevents water fluid flow to the steam generating chamber thereby stopping steam generation and pressure and initiating a rapid condensation period with the consequent production of a vacuum within the chambers.

8. A steam driven pump as in claim 1 in which the internal water circulation control means is a valve electrically operated by current from a photovoltaic cell array with a battery and having additionally, a temperature sensing means in the form of an electric probe capable of transmitting a temperature related signal to an amplifier and a relay in order to switch current for opening and closing the electric valve.

9. A steam driven water pump as in claim 3 in which the duct from the displacement chamber to the check valve and the water outlet is directed into a body of water such as a lake and the reaction that is produced as the water expelling means ejects water rearward from a boat is used to propel the boat.

10. A steam driven water pump as in claim 1 in which the steam generator heating means is a combustion heater such as a burner in heat flow communication with the heating chamber.

11. A steam driven water pump as in claim 1 in which the steam generator heating means is geothermal heat in thermal communication with the heating chamber.

* * * * *